United States Patent [19]

Paardekooper et al.

[11] Patent Number: 4,566,883

[45] Date of Patent: Jan. 28, 1986

[54] APPARATUS FOR GAS/LIQUID SEPARATION

[75] Inventors: Stephanus Paardekooper; Johan J. B. Pek, both of Amsterdam, Netherlands

[73] Assignee: Shell Oil Company, Houston, Tex.

[21] Appl. No.: 586,482

[22] Filed: Mar. 5, 1984

[30] Foreign Application Priority Data

Apr. 8, 1983 [GB] United Kingdom ............... 8309633

[51] Int. Cl.$^4$ .............................................. B01D 50/00
[52] U.S. Cl. ...................................... 55/329; 55/337; 55/347
[58] Field of Search ............... 55/325, 329, 337, 347, 55/348, 446, 440; 122/488–492

[56] References Cited

U.S. PATENT DOCUMENTS

| | | | |
|---|---|---|---|
| 2,594,490 | 4/1952 | Patterson | 55/347 |
| 3,266,224 | 8/1966 | Ferretti | 55/466 |
| 3,296,779 | 1/1967 | Daman et al. | 55/337 |
| 3,614,862 | 10/1971 | Connors | 55/337 |
| 4,015,960 | 4/1977 | Nutter | 55/318 |
| 4,162,150 | 7/1979 | Carson | 55/337 |
| 4,318,368 | 3/1982 | Carson et al. | 55/348 |
| 4,349,360 | 12/1982 | Schuurmans et al. | 55/348 |

*Primary Examiner*—David L. Lacey

[57] ABSTRACT

An apparatus for separating gas/liquid mixtures comprising an outer vessel having an inlet and separate gas and liquid outlets. A plurality of gas/liquid separating units are mounted in a horizontal tubesheet disposed in the vessel. Each separating unit has a vertical tubular member that defines an inner and outer space with the lower end of the tubular member communicating with the inlet. A swirl vane is mounted in each of the tubular members for imparting a swirl to the gas/liquid mixture to separate the gas and liquid. A primary gas outlet tube extends into each of the tubular members for removing the gas while the liquid is removed through discharge openings in the tubular members. Secondary gas outlets are positioned outside the tubular members while a demister mat is provided for removing any remaining liquid coming from the primary gas outlet tubes.

7 Claims, 2 Drawing Figures

APPARATUS FOR GAS/LIQUID SEPARATION

BACKGROUND OF THE INVENTION

The present invention relates to an apparatus for gas/liquid separation and more particularly to such as apparatus comprising a housing surrounding at least one normally vertically extending tubular wall defining a substantially tubular inner space and a substantially annular outer space within the housing. The housing has an inlet means for supplying a mixture of a liquid and gas into said inner space and an outlet means for separately discharging the liquid and the gas from the inner space. A swirl imparting means is disposed inside the inner space for imparting a rotary movement to the mixture of liquid and gas to separate the liquid and the gas.

The term gas is taken throughout the specification and the claims to also include vapor.

Devices of the above mentioned type are widely used in the oil and chemical industry. They may be applied in columns for merely separating gas/liquid mixtures, as well as in columns for contacting liquids and gases for generating an exchange of matter and/or heat between the phases and subsequently separating the phases. The above devices are normally mounted in or over openings in one or more horizontal trays. If the above mentioned devices are applied in columns for contacting liquids and gases, they are provided with mixing chambers having separate liquid and gas inlet means. In said mixing chambers the liquid is atomized in the supplied gas stream so that matter and/or heat between the liquid and gas may be exchanged. The so formed mixture of liquid and gas is supplied to the swirl imparting means of said devices for subsequently separating the liquid from the gas stream.

An example of an apparatus of the above type is described in British Pat. No. 1,123,546. This known apparatus comprises a cylindrical wall enclosing an inner space, in which a vane assembly is arranged for separating liquid from a gas/liquid mixture. The cylindrical wall is provided with liquid discharge openings for the withdrawal of the major part of the separated liquid. During operation a minor part of the separated liquid will leave the inner space via the upper end of the cylindrical wall.

Another example of a device of the above type for gas/liquid separation is described in U.S. Pat. No. 4,015,960. This known apparatus comprises an inner space enclosed by a tube and provided with blades for imparting a rotary movement to a mixture of liquid and gas introduced into said inner space via the open lower end of the tube. The liquid, being separated from the gas stream upon passing said blades, can be discharged from the inner space via an opening in the wall of the tube. The liquid discharge opening is arranged on approximately the same level as the blades. The remaining gas stream can be discharged from the inner space via an outlet tube arranged coaxially with the main tube and having the lower end thereof arranged inside said main tube.

The above mentioned known devices have a satisfactory separating action at rather moderate flow velocities of the mixtures to be treated and at rather moderate liquid loads. Both an increase of the flow velocity and an increase of the liquid load will, however, cause a decrease of the separating efficiency. This efficiency reduction is caused by the phenomenon of re-entrainment of liquid by the gas stream on leaving the inner space of the treating apparatus.

U.S. Pat. No. 4,349,360 describes an improved version of the type of devices known from the above mentioned publications. This improved gas/liquid treating apparatus is provided with a gas outlet, indicated with the expression primary gas outlet means, having its lower end arranged below the upper end of the inner space and separate secondary gas outlet means for withdrawing gas from the liquid flow leaving the inner space. The arrangement of the primary and secondary gas outlets enables a better separation of gas and liquid at higher loads.

SUMMARY OF THE INVENTION

The object of the present invention is to further improve the above mentioned devices for gas/liquid separation, i.e., to provide an apparatus with a still higher separation efficiency at a given load or a higher throughput at a desired efficiency than the devices described in the above patent specifications.

The increasing demand for gas for domestic and industrial use is attended with a growing need for installations able to treat the raw gas and making the gas suitable for use. One of the necessary treatments is drying of the gas, in order to improve the thermal efficiency and to minimize the risk of corrosion of the gas-transport pipelines. An increase of the demand for gas is therefore accompanied with the need for high capacity gas/liquid separation devices.

The apparatus for gas/liquid separation according to the invention thereto comprises a housing surrounding at least one normally substantially vertically extending tubular wall defining a substantially tubular inner space and a substantially annular outer space within the housing. A top wall is positioned above the tubular wall and confines said inner space and said outer space in upward direction. An inlet means supplies a mixture of gas and liquid into the lower part of the inner space that includes means for imparting a rotary movement to the mixture to separate the gas and liquid. An outlet means is provided for separately discharging gas from the inner space and comprises a primary gas outlet tube, arranged substantially coaxially with the tubular wall, passing through the top wall and having the lower end thereof positioned inside the inner space. At least one liquid discharge opening is arranged in the tubular wall for discharging the liquid. A second outlet means for separately discharging gas and liquid from the outer space comprises at least one secondary gas outlet tube through the top wall and a liquid discharge opening through the housing. The apparatus further comprises a layer of flow impinging means for separating liquid from gas, said layer being arranged above the upper end of the secondary gas outlet tube. The primary gas outlet tube closely fits in an opening extending substantially vertically through the layer, and a fluid communication is provided for substantially laterally discharging liquid from the primary gas outlet tube into the layer of flow impinging means.

During operation of the above apparatus according to the invention both the gas from the secondary gas outlet tube and the gas from the primary gas outlet tube are further dried to provide a substantially liquid-free gas flow. The apparatus can be subjected to very high gas and liquid loads without a substantial reduction of the efficiency of the apparatus. At a required efficiency high throughputs can be attained since only part of the total gas mass, namely the gas flow from the secondary gas outlet tube is forced to pass through the flow impinging means.

BRIEF DESCRIPTION OF THE DRAWINGS

The invention will now be further described with reference to the accompanying drawings, wherein.

DESCRIPTION OF A PREFERRED EMBODIMENT

Figure 1:
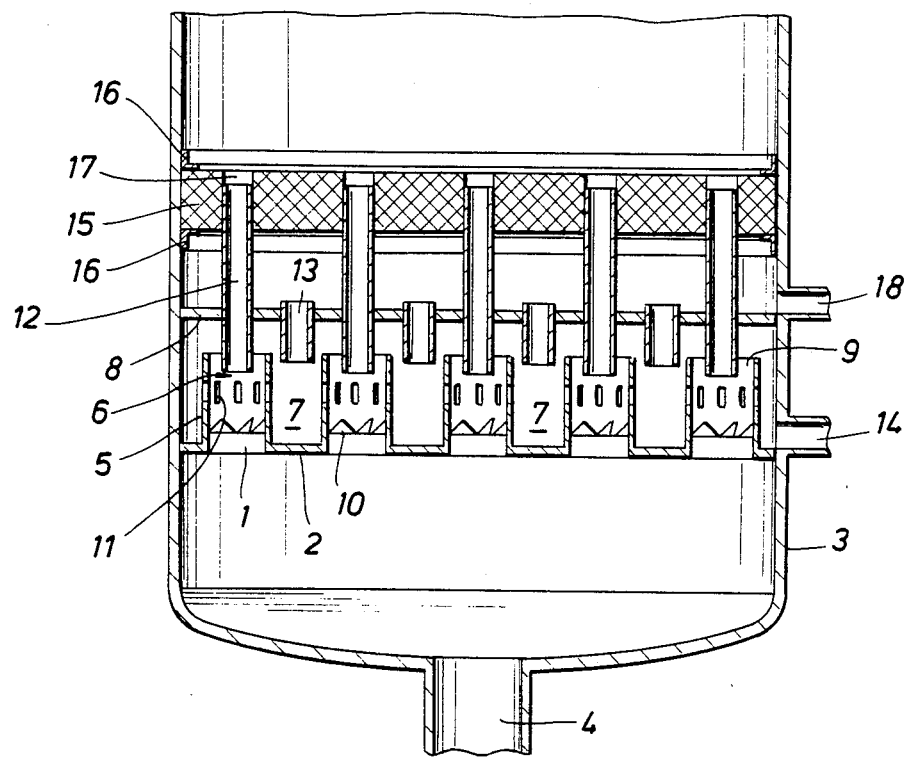
FIG. 1 shows a vertical section of the bottom part of an apparatus according to the invention for separating mixtures of liquid and gas.

It should be noted that identical elements shown in the drawings have been indicated with the same reference numeral.

Further, it is to be understood that the separate elements of one of the embodiments of the invention shown in the drawings may be applied individually to the other embodiments shown.

FIG. 1 shows the lower portion of an apparatus according to the invention for separating mixtures of liquid and gas, having as main components a plurality of tubular elements with swirl means arranged to cooperate with a so-called demister mat as will be explained hereinafter in more detail. The tubular elements with swirl means are indicated hereinafter with the expression swirl tubes.

The swirl tubes, having reference numeral 1, are arranged in openings of a substantially horizontal tray 2 mounted in a vessel 3, of which only the lower part is shown. An inlet 4 for a gas/liquid mixture to be separated is provided in the bottom part of the vessel 3. Each swirl tube 1 is formed by a substantially vertically extending tubular wall 5 defining a substantially tubular inner space 6 and a substantially annular outer space 7. The outer spaces of the various swirl tubes form the outer space 7 around the swirl tubes 1, which space 7 is confined in lateral direction by the wall of vessel 3 and in downward direction by the tray 2. A top wall 8 extends over the cross section of vessel 3 and is positioned at some distance above the tubular walls 5, thereby forming fluid passages 9 between the inner spaces 6 and the outer space 7. Each tubular wall 5 surrounds a substantially centrally positioned vane assembly 10 consisting of an number of not separately indicated stationary blades. As shown in FIG. 1 these vane assemblies are positioned in the lower parts of the inner spaces 6. The upper parts of the tubular wall 5 are provided with a plurality of oblong liquid discharge openings 11, which are substantially uniformly distributed over the peripheries of the tubular walls 5.

For the discharge of gas from the swirl tubes 1, a plurality of primary gas outlet tubes 12 extend through openings in the top wall 8. Each gas outlet tube 12 is substantially concentrically arranged relative to a swirl tube 1 and has its lower end positioned below the upper end of the relevant tubular wall 5. Apart from the primary gas outlet tubes 12, a further group of secondary gas outlet tube 13 extends through openings in the top wall 8. These secondary gas outlet tubes 13 have their lower ends arranged below the top wall 8 and discharge gas collected in the outer space 7. The secondary gas outlet tubes 13 are substantially equally distributed over the outer space 7 around the tubular walls 5. A discharge oulet tube 14 for discharging liquid from the outer space is mounted in an opening of the wall of vessel 1.

The other main component of the separating equipment is formed by a demister mat 15 arranged substantially horizontally above the top wall 8. In the shown embodiment the demister mat 15 consists of a layer of knitted or otherwise closely packed wires or fibers supported at its circumference by supporting rings 16 secured to the vessel wall. For a further support of mat 15 a perforated wall (not shown) may be optionally arranged at the upper side of said mat. The demister mat 15 itself is provided with a plurality of holes 17, in which the upper end parts of the primary gas outlet tubes 12 closely fit. As shown, the upper ends of said tubes 12 terminate below the upper surface of the demister mat 15 to allow the lateral escape of liquid from said tubes into the demister mat. A distance of only about 1 cm between the upper end of the tubes 12 and the upper end of the demister mat 15 has been found to be sufficient for a proper operation of the apparatus. The upper ends of the secondary gas outlet tubes 13 should, however, terminate below the lower surface of the demister mat 15 to promote distribution of the gas flows from said tubes 13 over the whole cross section of the demister mat. For discharging the liquid caught by the demister mat 15, from the vessel, a liquid outlet 18 is provided in the side wall of the vessel. The upper part of the vessel (not shown) is provided with an outlet for discharging substantially liquid-free gas and may enclose further equipment for treating the liquid-free gas from the demister mat 15.

In operation, a mixture of liquid droplets and gas, such as wet natural gas, to be dried, is introduced into the vessel 3 via inlet 4 and is caused to flow into the inner spaces 6 via the open lower ends of the swirl tubes 1. In the swirl tubes the gas/liquid mixture passes through the vane assemblies 10, that introduce a rotary movement to the flow. By the imparted rotary movement the relatively heavy liquid droplets are flung outwardly, impinge and subsequently coalesce on the inner surfaces of the tubular walls 5. The liquid collected on the inner surface of each tubular wall 5 creeps upwards, and the major part of the so formed liquid films will leave the inner spaces 6 via the liquid discharge openings 11 and the fluid passages 9 between the tubular walls 5 and the top wall 8. The separated liquid is collected in the outer space 7 and is subsequently discharged from the vessel 2 via the liquid discharge tube 14.

The major part of the gaseous components of the gas/liquid mixture is discharged from the inner spaces 6 of the swirl tubes 1 via the primary gas outlet tubes 12. Especially at high gas loads, it may happen that some of the liquid collected on the tubular wall 5 is entrained by the gas passing through the outlet tubes 12. One possibility for reducing the risk of liquid entrainment through the primary gas outlet tubes is to adjust the cross-sectional area of the primary gas outlet tubes relative to the dimensions of the tubular walls 5. It should, however, be kept in mind that reduction of the cross section of the primary gas outlet tubes will also have a negative effect in that it causes an increase of the pressure drop over the swirl tube. Especially at extremely high gas loads, this effect of pressure drop increase may cause additional problems.

The invention provided a further solution for reducing liquid entrainment by the gas flow. The liquid which is entrained by the gas passing through the primary gas outlet tubes 12 will still be in a swirling motion, imparted to the liquid upon passing the vane assemblies 10. On account of the difference in specific gravity of liquid and gas the entrained liquid will therefore flow along the inner surfaces of the outlet tubes 12. Upon arrival at the upper end of said tubes 12, the centrifugal force imposed on the liquid will force the liquid to flow outwardly into the demister mat 15, which mat operates as a flow impinging layer in which the flow velocity is suddenly reduced so that the relatively heavy liquid droplets will flow downward, while gas entering into said mat will maintain its upward flow direction. The major part of the gas in the primary gas outlet tubes 12, will flow through the holes 17 in the demister mat 15 and will not load the demister mat. In the above manner the gas leaving the holes 17 via the primary gas outlet tubes 12 will be substantially liquid free, providing the cross-sectional areas of the outlet tubes have been chosen relatively large to reduce the pressure drop.

The separated liquid that flows into the outer space 7 may contain minor amounts of gas, which gas is allowed to escape from the space 7 via the secondary gas outlet tubes 13. In order to enable substantially all of the liquid to leave the swirl tubes 1 via the liquid discharge openings 11 or the fluid passages 9, it is almost inevitable that, especially at low liquid loads, some gas will escape from the swirl tubes via the liquid outlets. The separation in the outer space 7 is accomplished by specific gravity differences of the liquid and gas, and will therefore be rather inefficient. In order to obtain substantially liquid-free gas, the gas from the secondary outlet tubes is caused to flow through the demister mat 15 for removing entrained liquid from the gas flow. The above mentioned distribution of the gas flow over the whole available area of the demister mat helps in eliminating liquid entrainment. Since the tubes 13 have their upper ends positioned below the demister mat the gas leaving the secondary gas outlet tubes 13 will distribute itself over the cross section of the vessel prior to entering the demister mat, so that the demister mat is substantially uniformly loaded with gas. The liquid in the gas flow will impinge on the fibers of the mat, and will separate from the upward gas flow due to the sudden liquid velocity reduction caused by the impact of the liquid droplets with the fibers. The separated liquid will flow downward and is withdrawn from the vessel via the liquid discharge outlet 18. Liquid-free gas leaving the demister mat may be directly recovered or may be further treated in the upper part of the vessel.

Since only a minor part of the total amount of gas from the swirl tubes 1 will pass via the gas outlet tubes 13 through the demister mat, high total gas flows may be applied without the risk of liquid entrainment by the gas passing through the demister mat. On the other hand very high flows are admissible without adverse pressure drop effects, since liquid entrained by the main gas flow passing through the primary gas outlet tubes 12 is removed therefrom by means of the demister mat 15.

Figure 2:
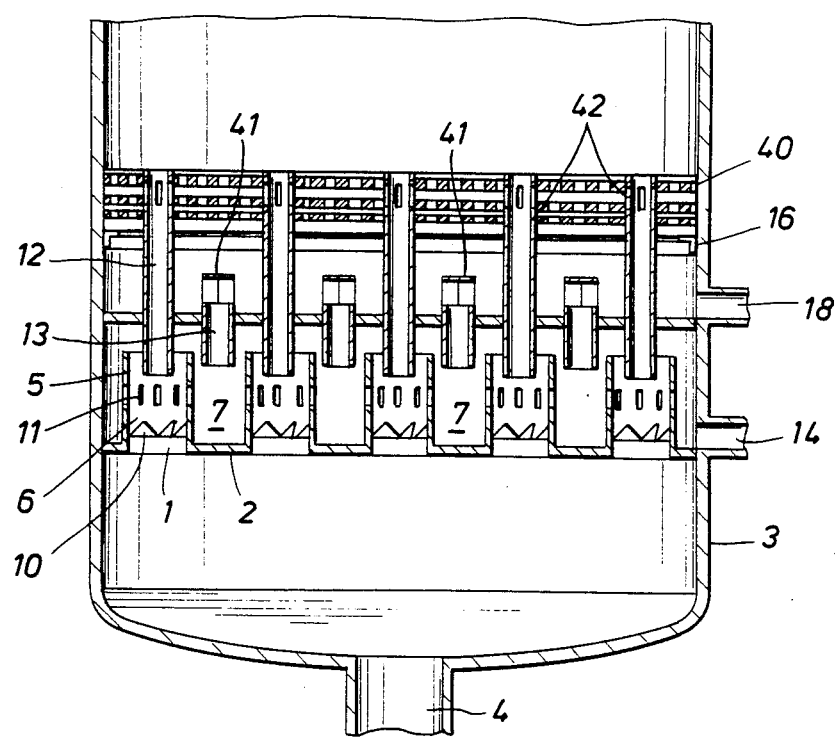
FIG. 2 shows a vertical section of a second embodiment according to the invention.

Reference is now made to FIG. 2 showing a second embodiment of the invention. In this further embodiment, the demister mat forming part of the first shown embodiment is replaced by a flow impinging layer 40 consisting of a plurality of perforated walls formed by, for example, sheets of expanded metal. The walls are so arranged one above another to eliminate a straight-through flow path. A further difference with the first shown embodiment consists of distributing plates 41 disposed on top of the secondary outlet tubes 13 to assist in distributing the fluid from the secondary outlets over substantially the total cross section of layer 40. Further, the primary gas outlet tubes 12 have their upper ends substantially flush with the upper end of layer 40 while the upper part of these tubes 12 is provided with a plurality of liquid discharge openings 42, substantially uniformly distributed over the circumference of said tubes 12. The openings are inclined in the direction of the swirling movement of the liquid to assist in the outflow of the liquid. Liquid flowing out of the tubes 12 is caught in the layer 40, so that liquid-free gas leaves the holes 17 in the layer 40.

The presence of the distributing plate 41 in the apparatus shown in FIG. 2, makes the apparatus particularly suitable for extremely high gas flows, since these plates 41 prevent local overloading of the layer 40 and promote a uniform fluid distribution over the whole cross section of layer 40. Instead of the openings 42 for liquid discharge, the upper part of the primary gas outlet tubes 12 might be formed from expanded metal, a grid or any other liquid permeable structure.

Although only two types of flow impinging means have been shown in the drawings, viz. a layer of closely packed wires or fibers 15 and a layer of expanded metal walls 40, any other flow impinging means may be chosen, such as for example, a plurality of layers of inclined vanes so arranged above one another as to optically mask the upper part of the vessel from its lower part in which the swirl tubes are arranged.

It should be noted that although the primary gas outlet tubes shown in the drawings have their lower ends arranged below the upper ends of the tubular walls 5 of the swirl tubes 1, in order to reduce liquid entrainment by the primary gas flow, this features does not form as essential part of an apparatus according to the present invention. According to the invention the primary gas is further treated by a demister mat to remove liquid therefrom. It will therefore be understood that at relatively low liquid loads the lower ends of the primary gas outlet tubes may be arranged above the tubular walls 5.

As shown in the drawings, the swirl tubes are mounted in openings in the wall 8. It should be understood that it is also possible to arrange the swirl tubes over openings in a wall.

The devices shown in the drawings may also be used in gas/liquid contact columns. To this end the swirl tubes shown in the drawings may be provided with mixing chambers, communicating with the lower ends of the swirl tubes, as described in U.S. Pat. No. 4,349,360. The columns should then be provided with separate inlets for liquid and gas.

What is claimed is:

1. An apparatus for separating gas/liquid mixtures comprising:
   a vessel having a first transverse wall adjacent one end, an inlet means disposed in said one end for said gas/liquid mixture;
   at least one swirl tube mounted in said first transverse wall for introducing a swirl flow in said gas/liquid mixture;
   a second transverse wall disposed in said vessel above said first transverse wall, said first and second transverse walls confining an outer space around said at least one swirl tube;

a primary gas outlet tube disposed coaxially with said at least one swirl tube, said primary gas outlet tube passing through said second transverse wall;

at least one liquid discharge opening in the wall of said at least one swirl tube, said at least one discharge opening communicating with the enclosed space between said first and second transverse walls;

at least one secondary gas outlet, said at least one secondary gas outlet passing through the second transverse wall and establishing communication between the space above said second transverse wall and the space between said first and second transverse walls;

a demister mat positioned above said second transverse wall, said demister mat being formed of flow impinging material, said primary gas outlet tube extending substantially through an opening in said demister mat; and an outlet formed in the portion of said primary gas outlet tube that extends into said demister mat and positioned and arranged for laterally discharging substantially all of the remaining liquid from the primary gas outlet tube into said demister mat.

2. Apparatus as claimed in claim 1, wherein the upper end of the primary gas outlet tube is arranged below the upper surface of said demister mat.

3. Apparatus as claimed in claim 1 or 2, wherein the flow impinging material of the demister mat comprises a layer of closely packed wires or fibers.

4. Apparatus as claimed in claim 1 or 2, wherein the flow impinging material of the demister mat comprises a plurality of perforated walls.

5. Apparatus as claimed in claim 1, wherein the lower end of the primary gas outlet tube is positioned below the upper end of the at least one swirl tube.

6. Apparatus as claimed in claim 1, wherein a flow distributing plate is mounted between the upper end of the secondary gas outlet tube and the demister mat.

7. The apparatus of claim 1, wherein said outlet for laterally discharging liquid from said primary gas outlet tube comprises at least one lateral opening disposed in a direction corresponding to the direction of the swirl flow of the gas/liquid mixture in the primary gas outlet tube.

* * * * *